United States Patent [19]

Barajas et al.

[11] Patent Number: 5,321,814
[45] Date of Patent: Jun. 14, 1994

[54] SYSTEM FOR OPTIONAL MODULE DETECTION AND RECONFIGURATION

[75] Inventors: Saul Barajas, Capistrano Beach; Leland E. Watson; Bruce E. Whittaker, both of Mission Viejo, all of Calif.

[73] Assignee: Unisys Corporation, Blue Bell, Pa.

[21] Appl. No.: 897,610

[22] Filed: Jun. 10, 1992

Related U.S. Application Data

[63] Continuation of Ser. No. 646,136, Jan. 25, 1991.

[51] Int. Cl.$^5$ ............................................. G06F 13/00
[52] U.S. Cl. ...................................... 395/200; 395/275
[58] Field of Search ................. 364/229.4, 243, 266.4, 364/938.2, 970.4, 243.7, 245, 929.21, 940.61, 222.82, 229.4; 395/425, 200, 575; 371/14, 11.1, 9.1, 11.1, 11.3

[56] References Cited

U.S. PATENT DOCUMENTS

| | | | |
|---|---|---|---|
| 4,549,296 | 10/1985 | Castel et al. | 371/14 |
| 4,575,714 | 3/1986 | Rummel | 340/568 |
| 5,014,193 | 5/1991 | Garner et al. | 364/200 |
| 5,038,320 | 8/1991 | Neath et al. | 371/11.1 |

*Primary Examiner*—Arthur G. Evans
*Assistant Examiner*—Moustafa M. Meky
*Attorney, Agent, or Firm*—Alfred W. Kozak; Mark T. Starr

[57] ABSTRACT

An automatic re-configurable computer system having a standard processor module and standard main memory and I/O control modules where each module is inter-connected to a common system bus. Automatic re-configuration occurs in the standard modules, when an optional module is connected onto the system bus, permitting inter-cooperation between the standard and optional modules to take place.

3 Claims, 3 Drawing Sheets

SYSTEM FOR OPTIONAL MODULE DETECTION AND RECONFIGURATION

This is a continuation of co-pending application Ser. No. 07/646,136 filed on Jan. 25, 1991.

FIELD OF THE INVENTION

This disclosure relates to computer systems where the operation of standard system modules interconnected into the system may alter their operation upon detection of an optional module which has been included into the system.

BACKGROUND OF THE INVENTION

In most computer systems there are a series of interconnected logical modules which are (often housed on logic cards) and these modules are interconnected together for data, command, and status information transfers. The actual physical interconnection between these modules may consist of cables, printed-circuit boards, backplane wiring, or plug-in mother boards. Quite commonly, a backplane will provide connective slots for insertion of logical modules residing on PC boards.

In such multiple module systems which are interconnected to each other, some of the modules will always be present, for example, the processor module will always be present. Likewise generally a main memory module will also always be present. In this disclosure, such "always present" modules will be referred to as "standard modules".

However, some of the modules in the interconnected system may also be what are called pluggable system "options" or optional modules. In certain cases these may not be present and in certain cases these may be present in a specific system. In the discussions herein, these options will be referred to as "optional modules". Art example of an optional module would be such type which might be called a "Cache Memory Module". Such types of an optional module can be added to an interconnected system in order to increase system performance.

Normally, it is essential for the so called standard modules to be informed of or "aware of" the presence or absence of the optional modules to which they may or may not communicate. In many systems, this detection is actually accomplished by the activities of human personnel at the time of the system manufacture or the time of system installation. In these type systems, the standard modules must be physically changed or reconfigured manually in some manner to indicate the status of the optional module.

However, it is most desirable and it is far more economically efficient, if all of the standard modules of the same type (for example processor cards) are manufactured and then inventoried identically so that in this fashion there is no special handling required during manufacture or installation.

The problem arises in that standard modules will generally act one way when there is no optional module present and the standard module will operate in another way when an optional module is present. Thus the problem often occurs of how to keep standard modules informed of the presence of, or of the absence of, the optional module situation.

This disclosure describes a method by which the actual standard hardware modules can be enabled to detect the presence of any optional modules. With the method and system disclosed herein, the standard modules will no longer need any special reconfiguration work which is based upon the state of the optional modules in the system. Also, the presently described method in this system presents a method by which the standard modules, upon detecting the state of the optional modules, will modify their own logic accordingly. In this fashion, all of the standard modules of the same type are maintained in an identical fashion and will need no special human reconfiguration, rewiring or redesign.

SUMMARY OF THE INVENTION

Each standard module, of an interconnected computer system of various modules or designs, is organized such that each standard module will have a optional module interface circuit which receives "presence" signals from an optional module if such optional module is interconnected into the system.

The interface circuit within the standard module is composed of driver circuits and receiver circuits wherein, when a optional module is present, it will enable both the driver and receiver circuits, such that the standard module will now be capable of sending a signal to the optional module and further the standard module will also be able to receive signals from the optional module thus to inform the standard module whether or not an optional module is present or absent and thus to enable the standard module to operate either in its nominal fashion or its special condition fashion when an optional module is present.

Thus this system arranges the operations so that no manual or human reconfiguration of standard system modules is necessary via Juniper, switches, rewiring and so on secondarily, it will be seen that the standard modules will automatically adjust their interface circuits for signals from optional modules in order to prevent the signal connections from affecting standard logic operation when the optional module is not present. Further, the standard system modules will now automatically adjust their special action type logic depending upon the presence of the optional module if the optional module is present.

DESCRIPTION OF PREFERRED EMBODIMENT

Figure 1:
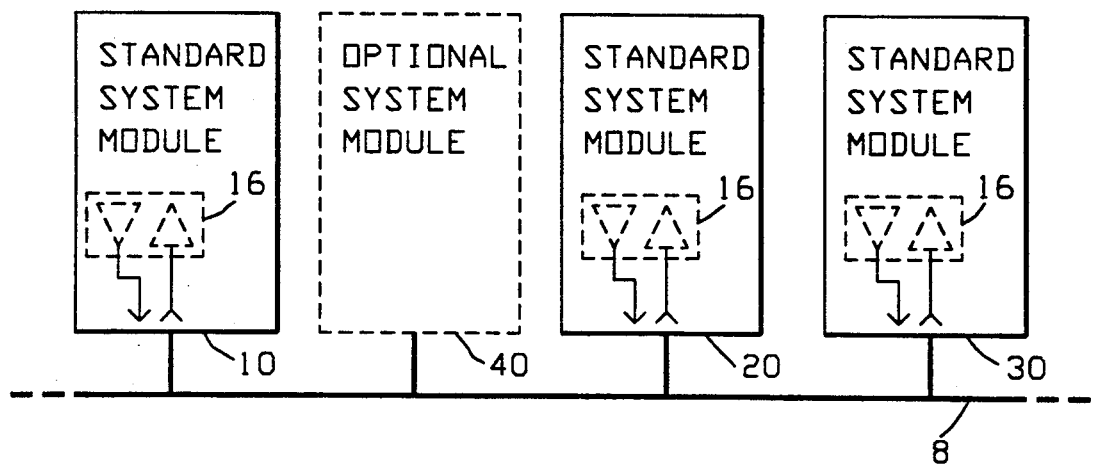
FIG. 1 is a block diagram of a computer system showing a series of standard modules which may or may not be connected to an optional module.

Referring to FIG. 1 there is seen a generalized block diagram of a computer system in which standard system modules 10, 20, and 30, are interconnected by a system bus such as bus 8 and in which shows, in dotted lines, the possibility of connecting in an optional system module 40. It is, of course, desirable that the standard system module hardware be able to detect the presence of an optional system module 40 without any human reconfiguration or switching being required. Also, for efficient operation, the standard system module such as 10, 20, and 30 must know whether the optional system modules are present or absent within the operating system. The normal system interconnections shown by the busline 8 can be either a backplane, or a foreplane, or a printed circuit card, or special cabling, or a plug-in mother board or combinations of these type of media. Each standard module 10, 20, 30, etc., is provided with an interface circuit 16 which has driver and receiver circuits (FIG. 4) connected to the optional module 40.

The optional modules such as item 40 are normally pluggable items which can be inserted into the system. It may be reiterated that it is necessary for a standard module to act one way when the optional module is present and to operate in a different fashion when the optional module is absent. Thus, for this to be possible, the standard module or modules must each be logically aware of the presence or absence of the optional module.

Some system manufacturers actually work to reconfigure the standard modules by means of switches or jumpers or other means to indicate whether the optional module will be present in that particular system. This is a highly undesirable activity because it requires special handling, special inventory storage and special manual setting up.

In the present system there is presented a simple optional module detector system which can easily be added to the standard modules at a very low cost.

Figure 2:
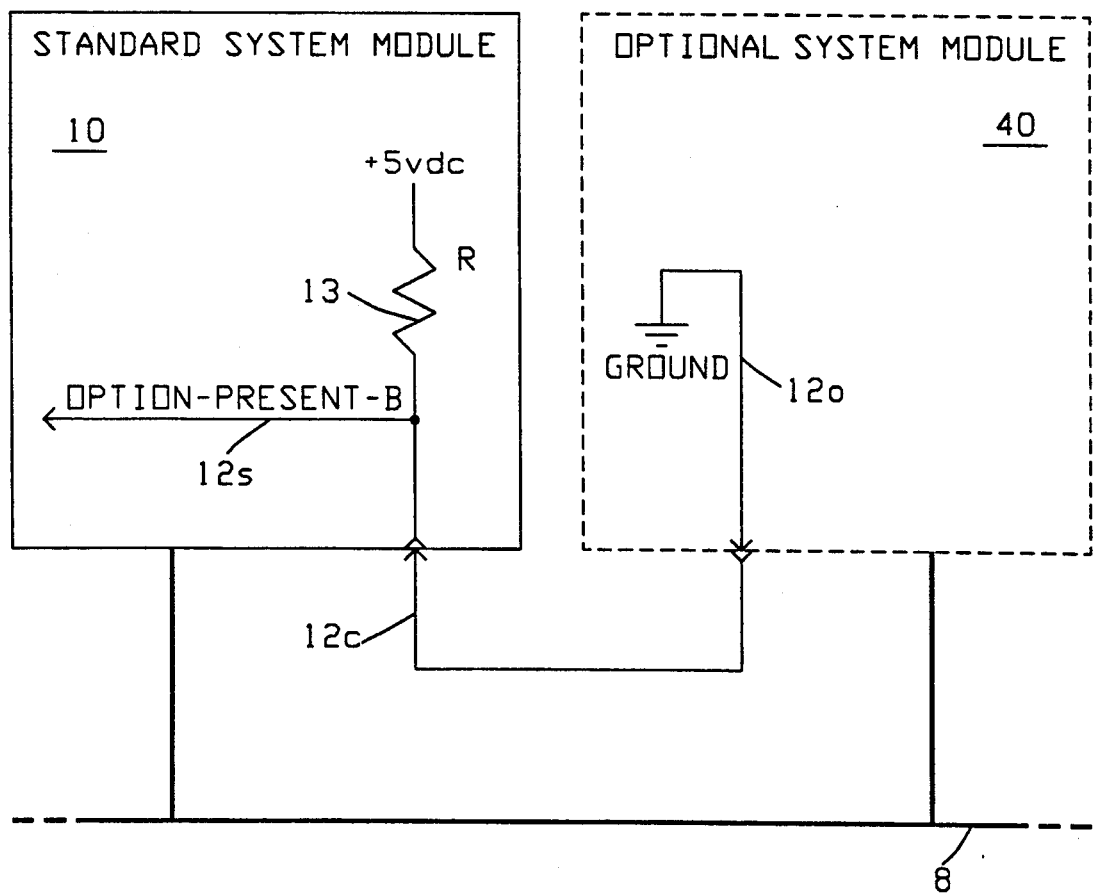
FIG. 2 is a drawing showing relationship between a standard module and an optional system module which when present permits a signal connection to be effectuated between two modules.

Referring to FIG. 2 there is shown the interconnected manner in which the "presence" of the optional module such as 40 is detected by the standard module such as 10. A single interconnection signal is provided for this detection. This interconnection signal is designated $12_c$. This signal $12_c$ is an active low signal (equal to zero) and is called OPTION-PRESENT -B Signal designated $12_B$ which connects between the optional module 40 and all of the standard modules (such as 10, 20, and 30) which require knowledge of its presence. This signal connection is present whether the optional module is plugged-in or actually absent.

As seen in FIG. 2 on the optional module 40, the Option-Present-B Signal $12_o$ is directly connected to ground. Thus, if the optional module 40 is physically present in the system, this signal $12_o$ is seen to be grounded.

On the standard module 10 (or modules 20, 30), the Option-Present-B Signal $12_S$ is connected to plus 5 volts DC via a resistor 13. The specific value of this resistor may vary depending on how many standard modules are monitoring the Option-Present B signal on line $12_S$ in the system design.

The Option-Present-B Signal $12_S$ now takes a known state when the optional module is present that is to say a low logical "zero" state, and when the optional module is absent takes on a high logical "one" state.

Thus this single signal connection via $12_c$ provides a mechanism by which the standard module or modules can detect the presence or absence of the optional module 40. The logic on the standard modules (10, 20, 30) can now automatically adjust their operation logic to the presence or absence of the optional module or modules. Thus no special reconfiguration, switching or manual handling is required by human intervention.

Figure 3:
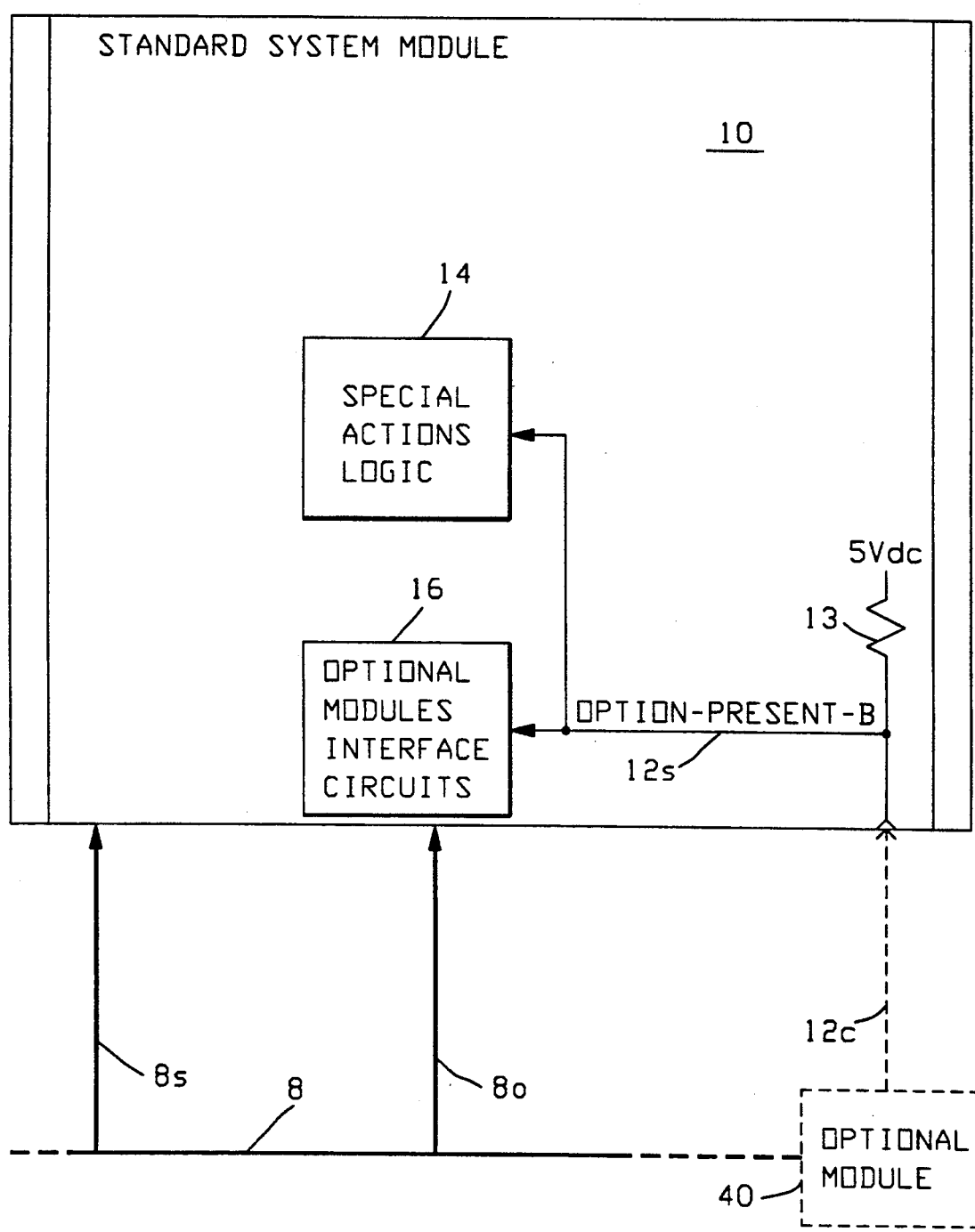
FIG. 3 is a block diagram of a standard module showing the presence of its added optional module interface circuitry and special action logic.

With reference to FIG. 3 there is seen the addition of the standard module self-adjustment logic which is included in the block 16 designated optional module interface circuits and in the block 14 designated special action logic. Each of these circuit units 14 and 16 receive input on line $12_s$ of the Option-Present-B Signal from the optional module 40.

The Option-Present-B Signal $12_c$ is utilized within the standard module 10 (or 20 or 30) to automatically adjust its own internal operational logic. This detection signal on line $12_s$ is used in two ways on the standard modules to alter their own internal state of operation.

As will be noted in FIG. 3, the normal system interconnections on bus 8 can be divided into separate groups of signals shown as the standard module interconnection signals on $8_s$ and the optional module interconnection signals on line $8_o$.

The special action logic 14 is circuitry which varies in operation depending upon what the functional involvement of the optional module is designed to do.

If, for example, the optional module is a "cache memory module", then the special logic 14 may be used to cause the processor card (a standard module) to look to the cache memory for a "hit" before doing a Main Memory (a standard module) operation.

If the cache memory is "not present", then all of the memory request operations go immediately to Main Memory.

The detection signal $12_c$ (FIGS. 2, 3, 4) is used in two ways on the standard modules to alter their operating states and these uses involve (i) Interface Circuit Adjustment and (ii) Look-Ahead Logic Adjustment, to be described hereinafter.

Figure 4:
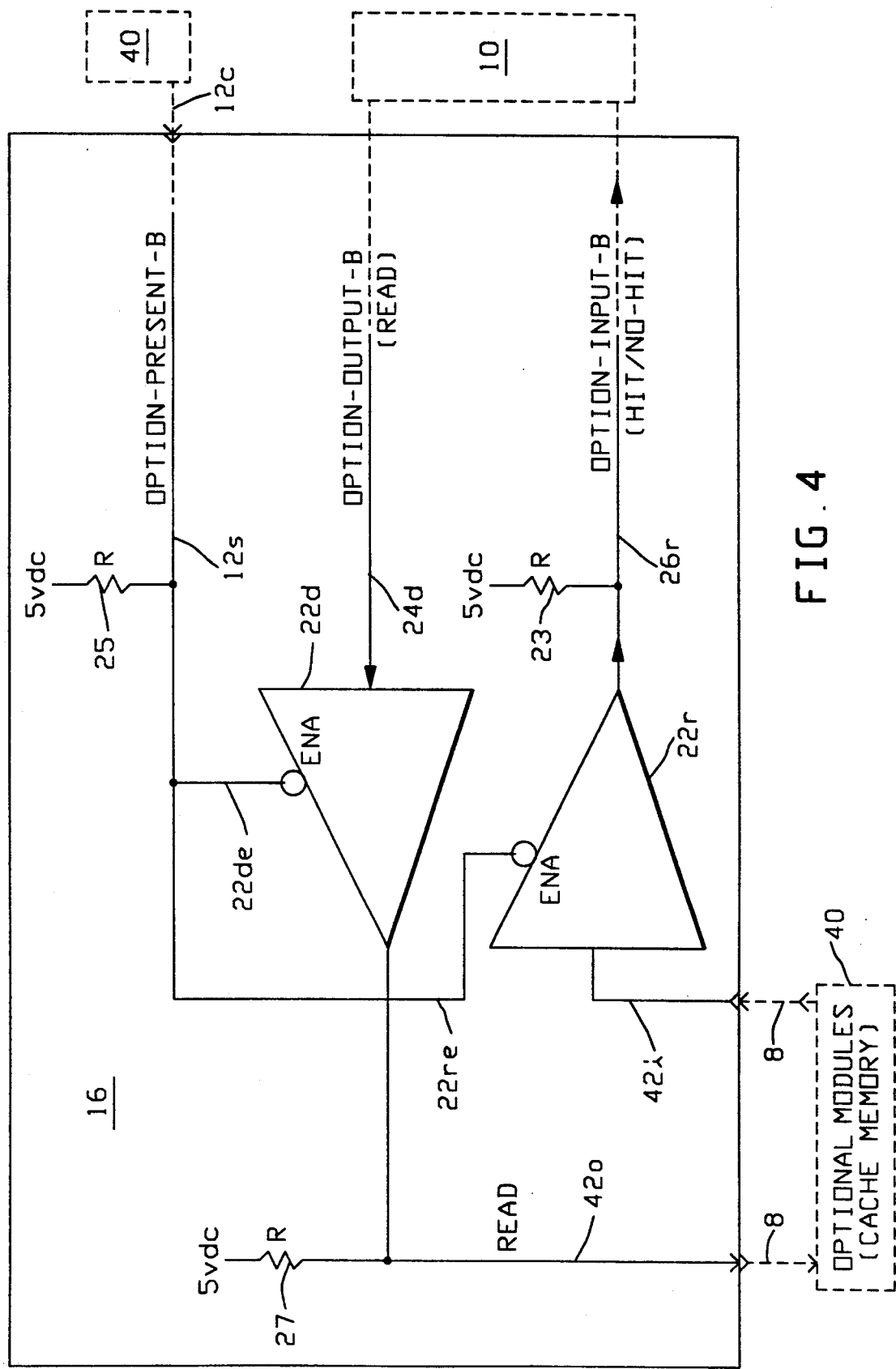
FIG. 4 is a drawing of the standard module interface circuits to and from the optional modules involved.

The optional module interface circuitry 16 of FIG. 3 is indicated in greater detail on FIG. 4 which indicates typical receiver and driver circuitry as interfaces within a standard module (as 10, 20, 30) with signals connecting from the optional module 40. It is necessary that any incoming signals (such as on line $42_i$) to the standard module 10, from an optional module 40, are put into a known certain state if the optional module 40 is not plugged into the system. The circuitry and schema shown accomplishes this with a minimal effect on the operation of the standard module 10.

The output signals from the optional module 40 do not affect the standard module 10 itself if module 40 is not present. The Option-Present-B Signal $12_s$ is simply used to enable the output driver circuits of FIG. 4 by the connections $22_{de}$ and $22_{re}$ which enable the driver circuit $22_d$ and the receiver circuit 22. This operates to reduce any unnecessary signal activity on the system backplane and thereby may even slightly reduce any potential noise problems which often occur.

The critical signals to the standard module 10 are the input signals $42d$ coming from the optional module 40 and the input signal $12s$ coming from the optional module 40. When the optional module 40 is present in the system, these inputs must be available to the standard module logic of modules 10, 20, and 30 of FIG. 1. However, if the optional module is absent from the system, then in this case, these signals must not effect the standard module operation.

Thus in order to accomplish this, these signals must be made to look as if they were "off" or in the inactive state. In FIG. 4, since the input receiver circuits $22_r$ are operable as "Tri-State" receivers, the Option-Present-B Signal $12_s$ can be used to "enable" these circuits. Then by adding a 1000 ohm pullup resistor 23 (connected to 5 volts VC) on each incoming signal, the input signals are put into the "off state" (high level equal to one) when the module is absent. The Tri-State operating receivers are typically made by a manufacturer such as the Fairchild Camera & Instrument Corporation of 1725 Technology Drive, San Jose, Calif. 95110 and are given the designation of 74 FCT244.

The signals on line $24_d$ are any control signals from the standard module 10 (processor) to the optional module 40 (via line $42_o$) (which, for example, might constitute a cache memory unit).

A typical signal on $24_d$ might be a Read or a Write command from the processor. If the cache memory (optional module 40) is "present", then the cache module 40 needs to know of the existing architecture in order to provide a "hit" signal on line 26 (via line $42_i$ FIG. 4) of (Optional-Input B) to the processor in standard module 10.

If the optional cache memory module 40 is "absent", then there is no reason for a signal on line $42_o$, and $42_i$ (FIG. 4) to be activated onto the system backplane.

An input of Option-Present B Signal on signal line $12_s$ (FIG. 4) can operate through lines $22_{de}$ and line $22_{re}$ to enable the driver ($22_d$) and receiver ($22_r$) circuits. On the other hand when not enabled, these circuits provide "Tri-Stated" Signals, which are floating signals. The floating signals are pulled up to a known voltage level of logic "high" (=1) through a resistor 27 to VDC. A "low-level" (logic equals zero) on the "ena" pins of the driver $22_d$ and receiver $22_r$ are used to enable these circuits.

As previously noted, the "detection signal" on line $12_c$ (from optional module 40, FIG. 2) can alter the operating state of a standard module in order to (i) adjust its interface circuit 16, FIG. 4, and (ii) provide a look-ahead action The second alteration just mentioned involves the look-ahead logic adjustment which may be seen in reference to FIG. 3. In FIG. 3 the special actions logic 14 can receive the Option-Present-B signal on line $12_s$ in order to effectuate the "look-ahead logic adjustment".

In a system where an optional module 40 may be, for example, a Cache Memory Module, the detection of the presence of this module can be used by the processor module 10 to make its operations more effective.

If the optional Cache Module 40 is present in the system, then all of the memory READ type operations will first attempt to access data from the much faster optional cache Module 40.

If the Cache Memory Module 40 optional module does not contain the data requested by the READ operation (that i.e. does not generate a "hit"), then the processor module 10 must go ahead and access the system Main Memory as Standard Module 20 for the data required. In order to access the main system memory (which is a much slower operation), the processor Module 10 must first gain access to the system bus resources 8 and then proceed with the Main Memory READ operation.

If the optional Cache Memory Module 40 (FIG. 2) is "not present" (line $12_c$=logic 0) in the system, then the Main Memory READ operation is the only resource available to the standard processor Module 10.

To make this operation more efficient in this particular case, the processor module 10 will not wait for any Cache Memory Module 40 to generate a "hit" response, but will anticipate (look ahead to) a main memory operation and gain access to the system bus resource 8 as soon as possible without going into any the of cache memory search. The special actions logic 14 (FIG. 3) rearranges the standard processor module 10 in its circuitry functions so that the processor does not look to the Cache Memory Unit.

This "look-ahead" cannot be done if a cache memory module (optional module 40) is present. Thus this look-ahead can save "non-cache systems" many clock times on executing the main memory operations.

It can be seen here that the Processor Module 10 which is a standard module, will automatically adjust itself depending on the presence or absence of the optional Cache Module 40. If the optional module is not present, the look-ahead logic 14 is then enabled. If the optional module is present, then the look-ahead logic 14 is disabled. In this case the special action logic 14, operating as the look-ahead logic, would be disabled. Thus more efficient operation is made possible by the detection of the optional module as being present or absent, as provided by the system of this disclosure.

Disclosed herein has been a system and method by which "standard" interconnected modules may be informed of the presence of an "optional" module automatically, without any human intervention or reconfiguration required, in a very simple and inexpensive fashion. This system permits the following features to be effectuated:

1. No manual reconfiguration of the standard system modules is necessary via Jumpers, switches, rewiring, etc.
2. The standard modules will automatically adjust their interface circuitry for signals from the optional modules in order to prevent the signal connections from affecting any standard logic operation whenever the optional module is not present.
3. The standard system modules will automatically adjust their special action type logic (for example, bus access look-ahead logic) depending upon the "presence" of the optional module. Due to the configuration of this system, it is no longer necessary for system manufacturers to make specialized standard modules and specialized optional modules and specialized interconnections which are time consuming and non-standard in order to configure a computer system. The present system will automatically take into account any presence or any absence of optional modules and permit the system to operate in the most efficient manner possible.

While the system and method described herein has been shown in its preferred embodiment there also may be other embodiments which provide the same advantageous features but which still fall within the compass of the following claims.

What is claimed is:

1. In a reconfigurable digital module computer system having a plurality of standard always-present modules and at insertable additive optional module, all connected to a common system bus, the reconfigurable system comprising:

(a) a plurality of always-present standard digital modules which include:

(a1) a standard processor module for executing microcode and operating system code instructions; and including:

(a1a) hardware reconfiguration logic means for reconfigurating the system when the presence of an added optional module is detected; said logic means for establishing communication with said optional module.

(a2) a standard main memory module for storing digital programs and data;

(a3) a standard input/output controller module for accessing data and code from peripheral units;

(a4) a plurality of detection lines, wherein each optional module locational position connects a single detection line to said standard processor module; and, (a5) wherein insertion of an optional module will signal its presence to said processor module to activate said reconfiguration logic means;

(a6) and wherein each of said always present standard digital modules includes:

(a6a) interface circuit means, activated by presence of said optional module, for enabling said reconfiguration logic means;

(b) said common system bus providing connecting lines between said standard always-present modules and each locational position which can receive an added optional module;

(c) each said locational position providing for connective insertion of a subsequently added optional module;

(d) said optional module being inserted for connection to said common system bus and including:

(d1) connection closure means for signaling the presence of said optional module to said reconfiguration logic means.

2. The system of claim 1 wherein each said interface circuit means includes:

(a) a driver circuit means activated by said optional module presence signal, for enabling signal transmission to/from said standard module to said optional module.

3. The system of claim 2 wherein said interface circuit means further includes:

(a) receiver circuit means, activated by said optional module presence signal, for enabling the receipt of control signals from said optional module to said standard module.

* * * * *